United States Patent [19]

Weinerman et al.

[11] Patent Number: 4,683,736

[45] Date of Patent: Aug. 4, 1987

[54] CABINET LOCK WITH RECESSED HANDLE

[75] Inventors: Lee S. Weinerman, Strongsville; Michael J. Rachocki, Brunswick; John E. Giarrizzo, Macedonia, all of Ohio

[73] Assignee: The Eastern Company, Cleveland, Ohio

[21] Appl. No.: 859,194

[22] Filed: Apr. 28, 1986

Related U.S. Application Data

[63] Continuation of Ser. No. 601,648, Apr. 18, 1984, abandoned.

[51] Int. Cl.[4] .............................................. B60R 25/02

[52] U.S. Cl. ....................................... 70/208; 292/165; 292/DIG. 63; 248/27.3; 70/81

[58] Field of Search ..................... 70/208.81, 467, 483, 70/484, 485, 489; 292/170, 165, DIG. 63, DIG. 31; 248/27.1, 27.3; 411/522, 523, 524; 24/573

[56] References Cited

U.S. PATENT DOCUMENTS

| | | | |
|---|---|---|---|
| D. 218,672 | 9/1970 | Lauper | D8/3 |
| D. 230,132 | 1/1974 | Pastva, Jr. | D8/6 |
| 2,686,687 | 8/1954 | Singleton | 411/522 |
| 2,874,986 | 2/1959 | Henrichs | 292/167 |
| 3,044,815 | 7/1962 | Soss | 292/173 |
| 3,055,204 | 9/1962 | Pelcin | 292/170 |
| 3,297,916 | 1/1967 | Wright | 411/522 |
| 3,584,483 | 6/1971 | Orr | 70/81 |
| 3,655,230 | 4/1972 | Armstrong | 292/170 |
| 3,782,141 | 1/1974 | Doerrfeld | 70/208 |
| 3,871,198 | 3/1975 | Miller | 70/208 |
| 4,038,718 | 8/1977 | Reilhac et al. | 292/DIG. 31 |
| 4,300,794 | 11/1981 | Dunsmoor | 292/DIG. 31 |
| 4,309,884 | 1/1982 | Davis | 292/DIG. 31 |
| 4,578,968 | 4/1986 | Messier, Jr. | 70/208 |

OTHER PUBLICATIONS

National Lock Hardware brochure and accompanying General Electric drawings (data and author unknown) showing a Flush Panel Lock.

Sweet's Architectural Catalog File, 1962; Sec. 16a/-Kav; p. 5; Handle with Illustrated Pattern.

*Primary Examiner*—Gary L. Smith
*Assistant Examiner*—Vinh Luong
*Attorney, Agent, or Firm*—David A. Burge

[57] ABSTRACT

A cabinet lock has an elongate body. An operating handle is connected to the body for pivotal movement about an axis that extends transverse to the length of the body. The body slidably mounts (1) a spring-projected latch bolt for linear movement along a path of travel that substantially parallels the axis of pivotal movement of the handle, and (2) an operating member for linear movement along a path of travel that substantially parallels the length of the body. The handle has a formation that drivingly engages the operating member for moving the operating member from a latched position to an unlatched position in response to pivotal movement of the handle from a nested position to an operating position. A key cylinder is rotatably mounted on the housing and carries a stop formation that is operable (1) when the key cylinder is in an unlocked position to permit sliding movement of the operating member along the body in response to movement of the operating handle from its nested to its operating position, and (2) when the key cylinder is in a locked position to retain the operating member in its latched position and to retain the handle in its nested position. The slide bolt retracts from its normally projected position in response to movement of the operating member from its latched to its unlatched position.

23 Claims, 23 Drawing Figures

CABINET LOCK WITH RECESSED HANDLE

CROSS-REFERENCE TO RELATED APPLICATIONS

The present application is a continuation of application Ser. No. 601,648, filed Apr. 18, 1984, by Lee S. Weinerman, Michael J. Rachocki, and John E. Giarrizzo, entitled CABINET LOCK WITH RECESSED HANDLE, now abandoned.

Reference is made herewith to design patent application Ser. No. 601,651 filed Apr. 18, 1984, by Lee S. Weinerman and Michael J. Rachocki, entitled (as amended) COMBINED LATCH OPERATING HANDLE AND HANDLE HOUSING.

BACKGROUND OF THE INVENTION

I. Field of the Invention

The present invention relates to a relatively low profile cabinet lock for securely releasably retaining a closure such as the door of a cabinet in its closed position. Locks embodying the preferred practice of the present invention are particularly well suited for use with such metal enclosures as industrial circuit breaker cabinets that need rugged, relatively low profile locks with operating handles that are preferably recessed.

II. Prior Art

While locks of a wide variety of configurations have been proposed for use in releasably retaining cabinet doors closed, there remains a need for an improved cabinet lock of relatively simple and inexpensive, yet rugged construction, wherein the lock is formed from a small number of components that are easily assembled, and wherein the assembled lock has a relatively low profile, preferably with a recessed operating handle. Especially with respect to industrial enclosures for electrical controls, for example metal cabinets for supporting and housing circuit breakers, there remains a need for a ruggedly constructed, low profile lock that operates smoothly, that provides a secure locking action, and that can be anticipated to operate effectively throughout a lengthy life.

A situation sometimes encountered with enclosures for circuit breakers is that an unusually high current overload through a circuit breaker may cause an almost explosive destruction of the breaker. Should a circuit breaker fail in this manner, very sizable forces may be found to impact the surrounding cabinet, and especially the door of the cabinet. These impact forces have been found to exceed the closure-retaining capabilities of many light-duty locks.

SUMMARY OF THE INVENTION

The present invention addresses the foregoing and other needs by providing a novel and improved lock for releasably retaining a closure such as a door of a circuit breaker cabinet in a closed position.

In preferred practice, a cabinet lock embodying features of the invention has a housing that includes an elongate body. An operating handle is mounted on the housing for pivotal movement about an axis that extends transverse to the length of the body. The body slidably mounts (1) a latch bolt for linear movement along a path of travel that substantially parallels the axis of pivotal movement of the handle, and (2) an operating member for linear movement along a path of travel that substantially parallels the length of the body. The handle has a formation that drivingly engages the operating member for moving the operating member from a latched position to an unlatched position in response to pivotal movement of the handle from a nested position to an operating position. A key cylinder is rotatably mounted on the housing and carries a stop formation that (1) is operable when the key cylinder is in an unlocked position to permit sliding movement of the operating member along the body in response to movement of the operating handle from its nested to its operating position, and (2) is operable when the key cylinder is in a locked position to retain the operating member in its latched position and to retain the handle in its nested position. Interacting cam surfaces are provided on the slide bolt and on the operating member for causing the slide bolt to retract from its normally projected position in response to movement of the operating member from its latched to its unlatched position. A compression coil spring is interposed between the slide bolt and the housing to bias the slide bolt toward its projected position. The biasing action of the spring is transmitted through the interacting cam surfaces to the operating member for biasing the operating member toward its latched position, and through the operating member to the handle for biasing the handle toward its nested position.

The housing preferably has a front portion that defines a forwardly facing recess for receiving and nesting portions of the operating handle. The body of the housing is preferably formed integrally with and extends rearwardly from the front portion. The body preferably has opposed sides that define track formations which parallel the length of the body and cooperate to slidably mount the operating member on the body. The operating member is preferably formed as a metal stamping which has opposed, inwardly turned side portions that engage the track formations to securely slidably mount the operating member on the body for movement along a path of travel that parallels the length of the body. The operating member and the slide bolt preferably interact such that each serves to hold the other in place on the body, and to limit the extent to which the other may move relative to the body. The slide bolt and the operating member are preferably mounted on the housing and interact with each other and with the housing in a manner that results in each of these components serving to reinforce each other, and to thereby strengthen and rigidify the lock assembly.

Further features of a lock that embodies the preferred practice of the present invention lie in the ease with which its components can be assembled. Lock assembly is typically effected by the very simple steps of (1) sliding the slide bolt and its projecting spring into a slide bolt channel that is defined by the housing, (2) sliding the operating member onto the housing and into engagement with the slide bolt so that the operating member serves to retain the slide bolt on the housing, (3) installing the key cylinder in a receiving formation provided on the housing such that the operating member and the key cylinder cooperate to retain each other in proper positions on the housing, and (4) driving a pin into aligned apertures formed through the operating handle and through the housing to pivotally mount the operating handle on the housing, with projecting formations of the operating handle helping to retain the operating member in place on the housing.

The manner in which the key cylinder is preferably retained by the housing not only simplifies assembly of the lock, but also enables key cylinders to be readily changed if desired. A groove is formed along the full length of the passage into which the key cylinder is installed. The groove opens through the front wall and through the back wall of the housing. The key cylinder includes a projecting portion that must be aligned with the groove in order for the key cylinder to be installed in the passage. When the key cylinder is in place on the housing, the projecting portion extends out of the passage beyond the back wall of the housing so that the key cylinder can be turned in the passage to rotate the projecting portion out of alignment with the passage. Once the projecting portion is rotated to a position out of alignment with the passage, the projecting portion engages the back wall of the housing and serves to retain the key cylinder in the passage. When the operating member is positioned within the normal range of its movements (i.e., for movement between its latched and unlatched positions), the operating member blocks rotation of the key cylinder to a position wherein the projecting portion aligns with the groove (i.e., the operating member blocks rotation of the key cylinder to a position wherein the key cylinder can be removed from the housing). Thus, the key cylinder is retained on the housing solely by virtue of cooperative action of appropriately configured portions of the housing, the operating member, and the projecting portion of the key cylinder itself. Removal of the key cylinder for servicing or for replacement can be effected by moving the operating member out of its normal range of movement to a position where it will let the projecting portion of the key cylinder align with the groove so that the key cylinder can be withdrawn from the passage.

Still another feature of a lock which embodies the preferred practice of the present invention lies in the use of a ruggedly constructed spring clip which cooperates with mounting formations provided on opposed end portions of the lock's housing to securely mount the lock on a closure such as the metal door of a circuit breaker cabinet, with a body portion of the lock's housing extending through a hole that is formed in the closure. In preferred practice, a heavy spring steel clip of generally C-shaped configuration is used to mount the lock on the closure, with spaced leg portions of the C-shaped clip being wedged between the closure and mounting formations that are provided on opposed end regions of the lock's housing.

Yet another feature of the invention lies in the provision of a lock that has a housing and an operating handle that are so ruggedly configured that either or both of these elements may be formed, substantially interchangeably, from die cast metal or from rigid, relatively high density, injection molded plastics material, as may be desired.

BRIEF DESCRIPTION OF THE DRAWINGS

The foregoing and other features and advantages, and a fuller understanding of the invention may be had by referring to the following description and claims, taken in conjunction with the accompanying drawings wherein:

DESCRIPTION OF THE PREFERRED EMBODIMENT

Figure 1:
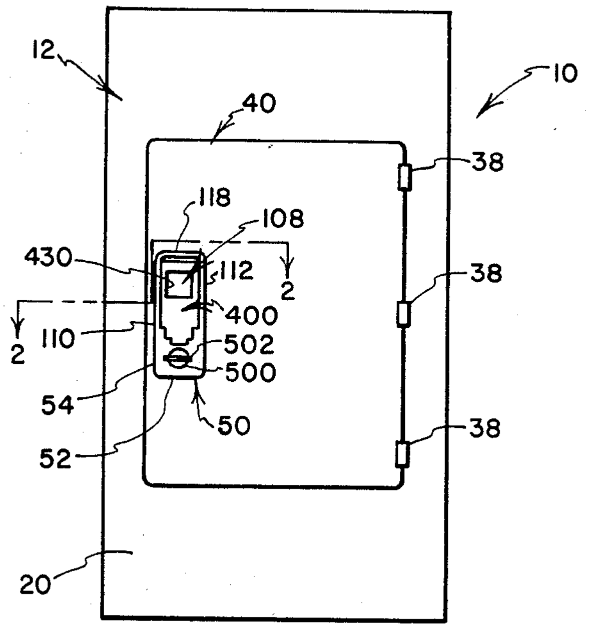
FIG. 1 is a front elevational view of a circuit breaker cabinet having a hinged door and employing a lock which embodies the preferred practice of the present invention for releasably maintaining the door in its closed position.
Figure 3:
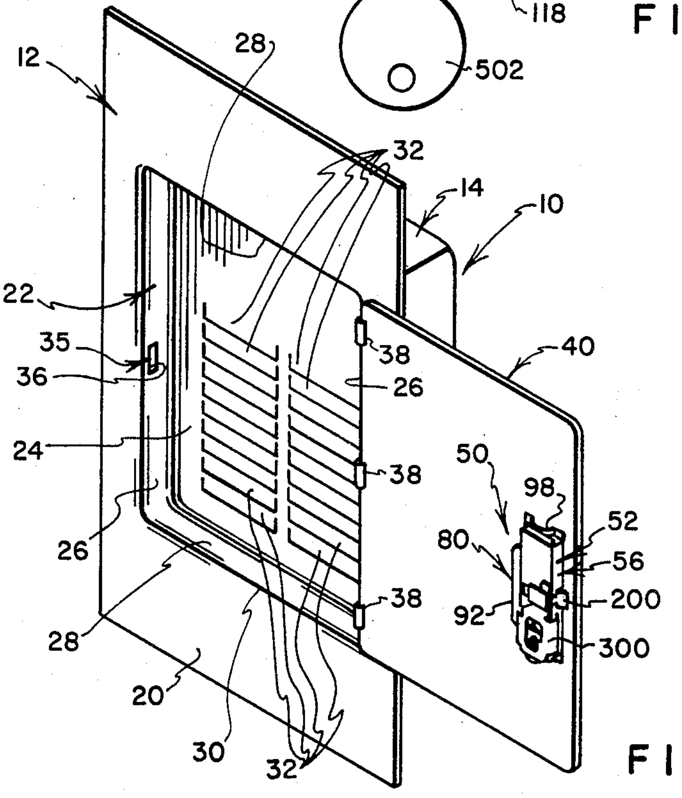
FIG. 3 is a perspective view of the cabinet of FIG. 1, with the door in an open position.

Referring to FIGS. 1 and 3, a typical commercially available cabinet for supporting and housing electrical components such as circuit breakers and the like is indicated generally by the numeral 10. The cabinet 10 includes a front plate 12 that cooperates with a housing structure 14 to define an enclosure. As is best seen in FIG. 3, the housing structure 14 lies behind and extends rearwardly from the front plate 12.

The front plate 12 has perimetrically extending flange portions that lie in a common plane and define a contiguous front wall 20. The front wall 20 surrounds a forwardly facing recess 22. The recess 22 is formed by a substantially planar back wall 24, and by side and end walls 26 and 28 that define opposed sides and opposed ends, respectively, of the recess 22. The side and end walls 26, 28 join with the front wall 20 in such a manner as to define a generally rectangular opening 30 through the front wall 20 into the recess 22.

The front wall 20, the back wall 24, and the side and end walls 26, 28 are typically formed in one integral piece as a stamped sheet of steel. In forming this stamping, a plurality of marginally attached, readily removable "knockouts" 32 are provided in the back wall 24. The knockouts 32 may be selectively removed from the back wall 24 to permit access to be had through the back wall 24 to such circuit breakers (not shown) as may be supported and housed within the cabinet 10.

Figure 2:
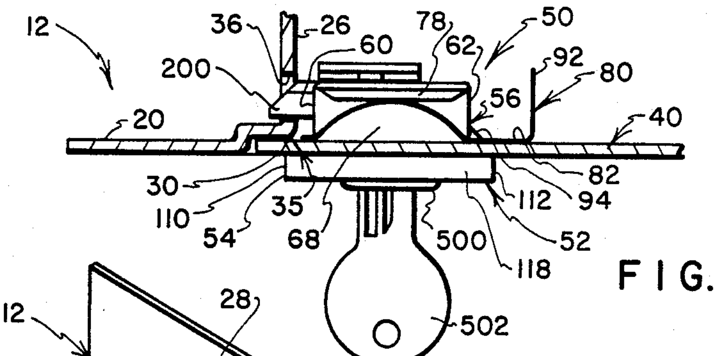
FIG. 2 is a sectional view, on an enlarged scale, showing portions of the cabinet, the door and the lock, as seen from planes which are indicated by a broken line and arrows 2—2 in FIG. 1.

Referring to FIGS. 2 and 3, a strike formation in the form of an abutment surface 35 and an elongate slot 36 are provided along one of the opposed side walls 26. The slot 36 extends through this side wall 26 and serves to receive a projecting portion of a slide bolt 200 that forms a part of a lock 50 which is carried by a door 40.

Figure 5:
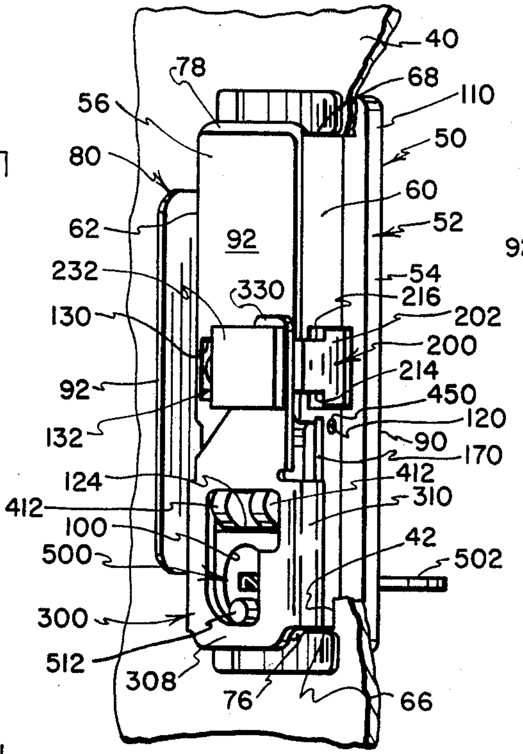
FIG. 5 is a perspective view showing the lock and portions of the door, with the lock's key cylinder in its locked position, with the lock's operating handle pivoted to its nested position, with the lock's operating member in its latched position, and with the lock's slide bolt projected, and showing a spring clip that is utilized to hold the lock's housing in place on the door.
Figure 9:
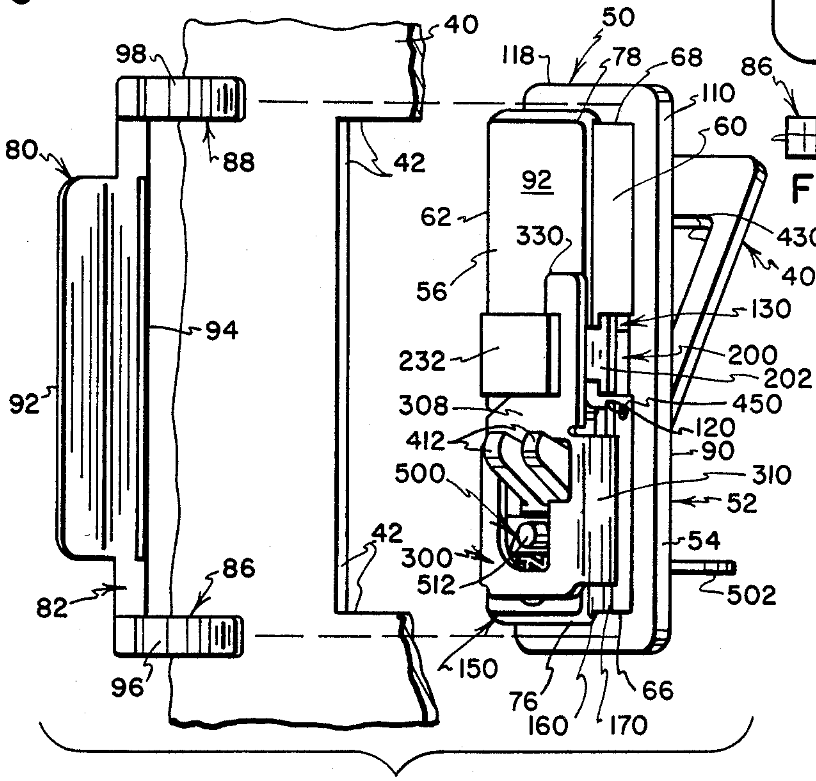
FIG. 9 is an exploded perspective view of the components of FIG. 5, with the lock's key cylinder in its unlocked position, with the lock's operating handle pivoted to its operating position, with the lock's operating member in its unlatched position, and with the lock's slide bolt retracted.
Figure 10:
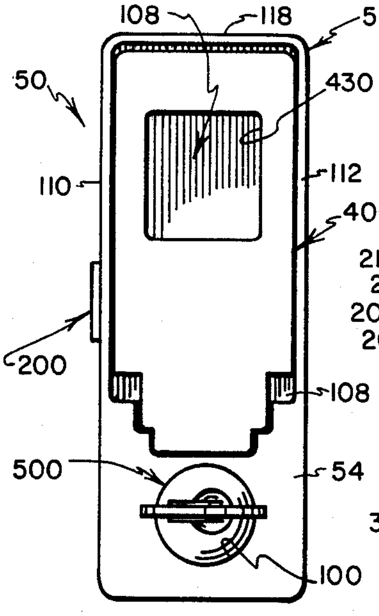
FIGS. 10, 11 and 12 are front, side and rear elevational views of the lock, respectively, with the lock's relatively movable components, positioned as in FIG. 5.

Referring to FIGS. 1 and 3, a plurality of hinges 38 are provided at spaced locations along the other of the opposed side walls 26. A door 40 is pivotally connected by the hinges 38 to the front plate 12 for selectively providing access through or closing the opening 30. The hinges 38 mount the door 40 for pivotal movement between a closed position, as is illustrated in FIG. 1, and an open position, as is illustrated in FIG. 3. The door 40 is typically formed as a stamping from a sheet of steel, and, as is best seen in FIGS. 5 and 9, has a generally rectangular hole 42 formed therethrough at a location that lies near the slot 36 when the door 40 is closed.

Such cabinet features as are described above have been included herein solely for the purpose of illustrating one exemplary environment in which locks that embody features of the present invention may be utilized. While a circuit breaker cabinet 10 has been described as constituting one exemplary use environment, those skilled in the art will understand that locks which embody features of the present invention have wide ranging application, and that features of the present invention are not limited to use with electrical equipment enclosures.

Referring to FIGS. 1–5 and 9, a lock 50 embodying the preferred practice of the present invention is provided for releasably retaining the door 40 in its closed position. The lock 50 includes an elongate, generally rectangular housing 52. The housing 52 has a generally rectangular front portion 54 that has dimensions which exceed those of the rectangular hole 42. The housing 52 also has a rearwardly extending body 56 that is configured to permit its readily being inserted into the rectangular hole 42. A spring clip 80 of generally C-shaped configuration is provided for engaging opposed end regions of the body 56 to retain the lock 50 in place on the door 40, as will be described in greater detail.

Before turning to a more detailed description, a brief overview of the components that form the lock 50 is in order. The lock 50 has a projecting slide bolt 200 that is configured to be received within the elongate slot 36 of the front plate 12 to retain the door 40 in its closed position. Other major components of the lock 50 include a compression coil spring 250 that is interposed between the housing 52 and the slide bolt 200 to bias the slide bolt 200 toward its projected position, an operating handle 400 that is pivotally mounted on the housing 52 for movement between nested and extended positions, an operating member 300 that is slidably mounted on the body 56 for interacting with the slide bolt 200 and with the operating handle 400 to coordinate movements and positioning thereof, and a key cylinder 500 that is carried by the housing 52 for selectively permitting and preventing certain movements of the operating handle 400 and the operating member 300. As will be apparent from the description that follows, movement of the operating handle 400 from its nested position, as is illustrated in FIGS. 1, 5, 10, 11 and 15, to its extended position, as is illustrated in FIG. 9 and 19–21, is operable to cause the slide bolt 200 to retract such that the slide bolt 200 no longer extends into the elongate slot 34, whereby the lock 50 no longer engages the front plate 12, and the door 40 can be opened.

The manner in which the lock 50 is installed and held in place on the door 40 is best understood by referring to FIGS. 2, 5 and 9. The body 56 of the housing 52 has opposed side walls 60, 62, and opposed end walls 66, 68. The side walls 60, 62 extend substantially parallel to each other along the length of the body 56, and are configured such that they enable the body 56 to slip fit with ease into the rectangular hole 42. The end walls 66, 68 carry projecting tabs 76, 78, respectively, and are configured such that neither the end walls 66, 68 nor the tabs 76, 78 prevent insertion of the body 56 into the rectangular hole 42. The C-shaped spring clip 80 engages the tabs 76, 78 and holds the lock 50 in place on the door 40.

Figure 6:
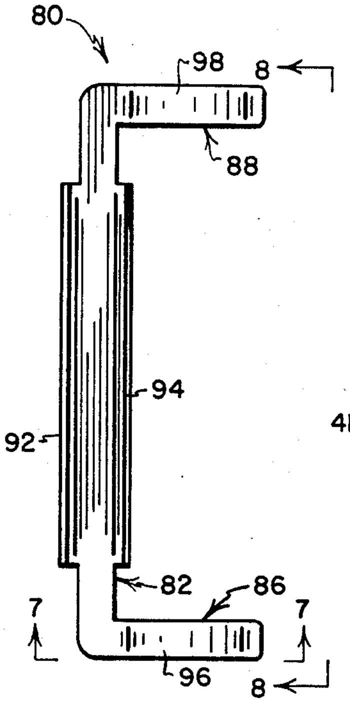
FIG. 6 is a rear elevational view of the spring clip.
Figure 7:
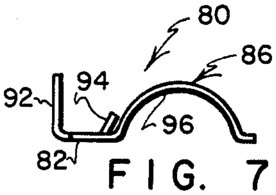
FIGS. 7 and 8 are bottom plan and side elevational views, respectively, of the spring clip, as seen from planes indicated by arrows 7—7 and 8—8 in FIG. 6.
Figure 8:
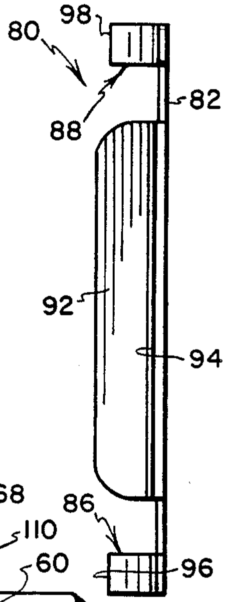

Referring to FIGS. 6–8, the spring clip 80 has an elongate stem 82, and a pair of elongate arms 86, 88 that project from opposed end regions of the stem 82. The arms 86, 88 have curved portions 96, 98 that underlie and engage the tabs 76, 78 such that, when the spring clip 80 is forcibly moved into position between the door and the tabs 76, 78, the arms 86, 88 are caused to be compressed and deflected, whereby the biasing action of the spring steel from which the clip 80 is formed causes the clip 80 to sturdily and securely grip the lock 50 and to hold the lock 50 in place on the door 40. A pair of raised positioning ribs 92, 94 extend along mid portions of the stem 82 to reinforce the stem 82 and to provide formations that can be engaged by suitable tools to force the spring clip 80 into proper position to mount and retain the lock 50 on the door 40, as is depicted in FIGS. 2, 3 and 5.

Figure 4:
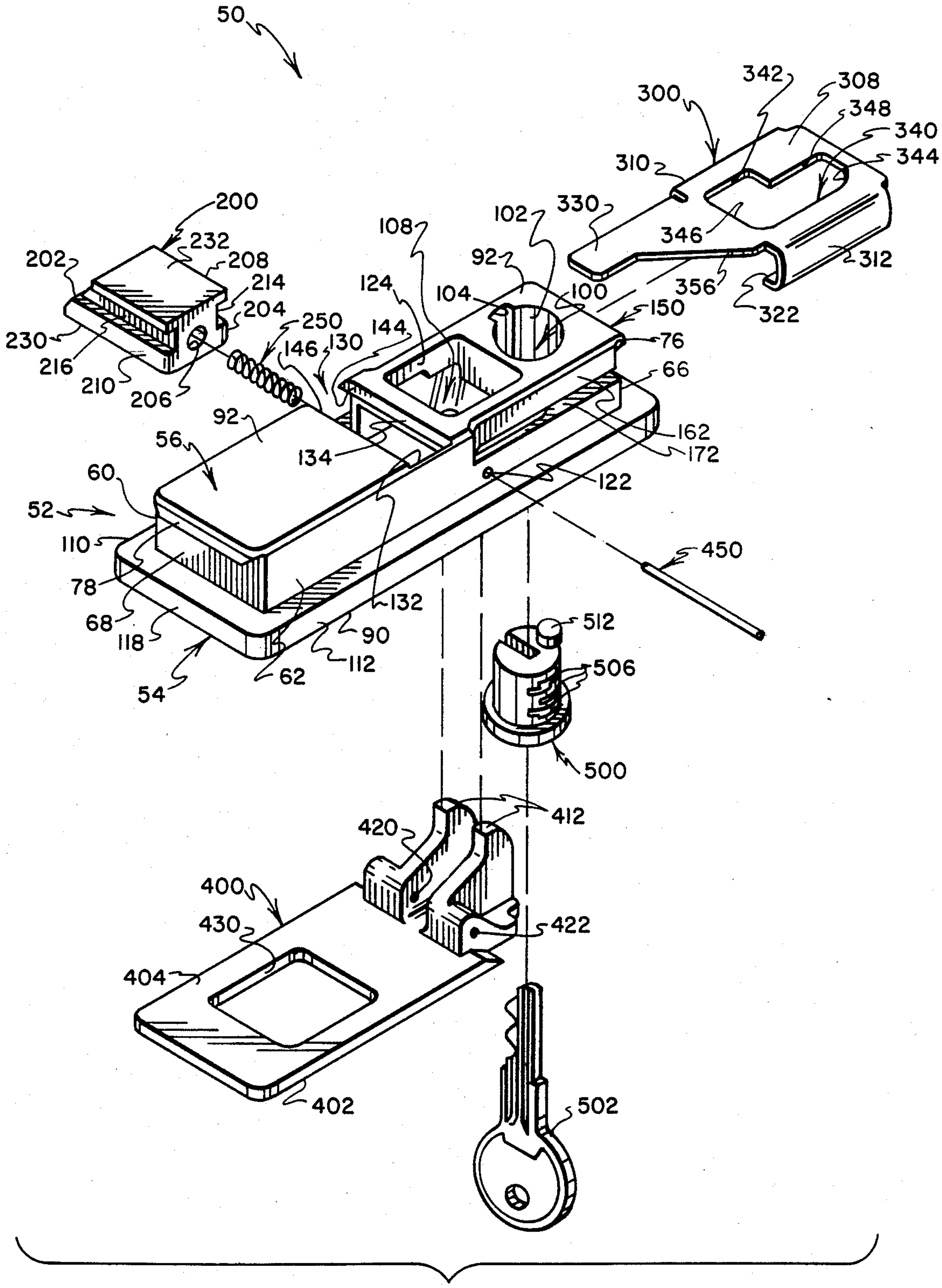
FIG. 4 is an exploded perspective view, on an enlarged scale, of components of the lock.

The housing 52 is preferably formed as a one piece structure from die cast metal, or from rigid, relatively high density injection molded plastics material, whereby the front portion 54 and the body 56 are integral parts of the same one-piece component. Referring to FIGS. 10–15, the front portion 54 has a substantially planar front wall 90 of generally rectangular configuration. Referring to FIGS. 4 and 5, the body 54 has a substantially planar rear wall 92 of generally rectangular configuration. A passage 100 is formed through the front portion 54 and through the body 56 to receive the key cylinder 500. The passage 100 opens through the front and rear walls 90, 92. Referring to FIGS. 4 and 14, the passage 100 takes the form of a hole 102 that has grooves 104, 106 formed in opposed side portions thereof. The groove 104 extends the full length of the hole 102. The groove 106 extends from the front wall 90 to a position near the rear wall 92, but does not open through the rear wall 92. The grooves 104, 106 cooperate with the key cylinder 500 to receive tumblers 506 that project therefrom when its key 502 is removed, as will be explained.

Figure 11:
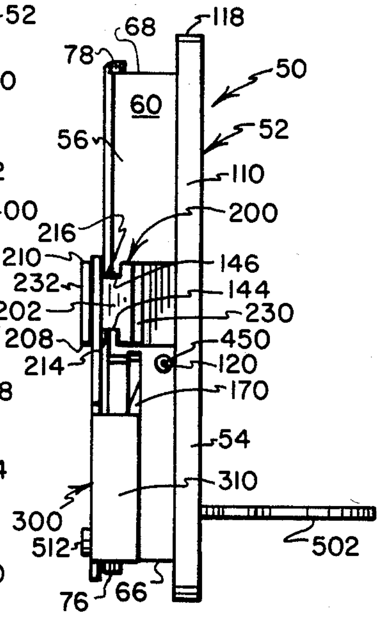
Figure 12:
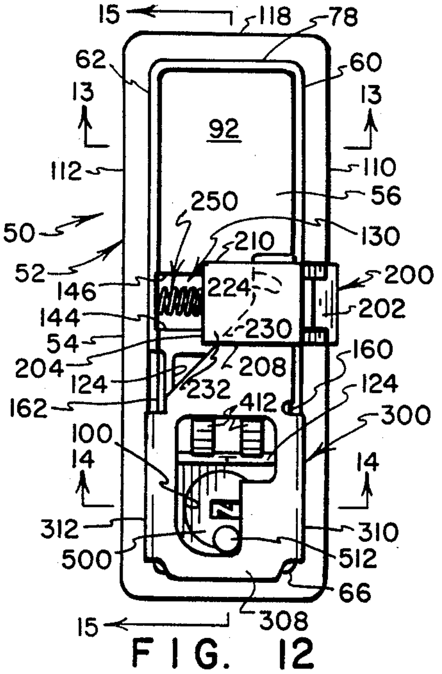
Figure 13:
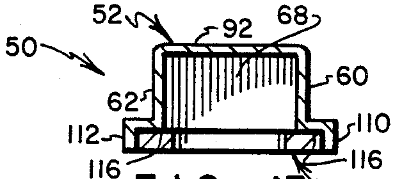
FIGS. 13, 14 and 15 are sectional views as seen from planes indicated by arrows 13—13, 14—14 and 15—15, respectively, in FIG. 12.
Figure 14:
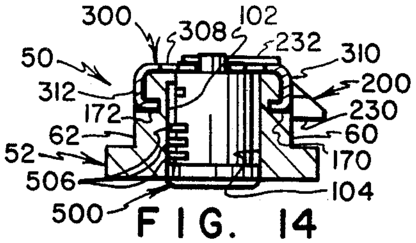
Figure 15:
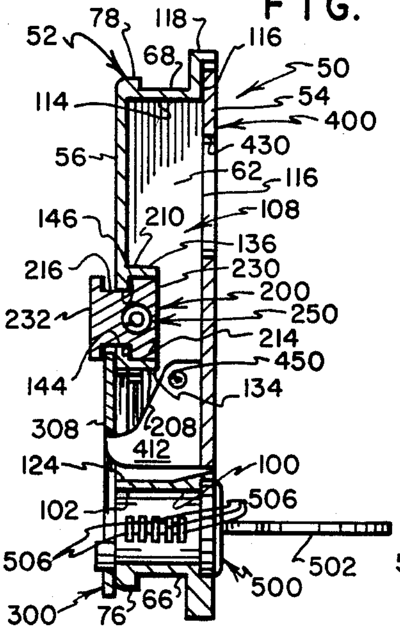

Referring to FIGS. 10–15, a generally rectangular, forwardly facing cavity 108 opens through the front wall to receive and nest the operating handle 400. Referring to FIGS. 13 and 15, the cavity 108 is of "stepped" configuration on three of its four sides. Side wall portions 110, 112, and an end wall portion 118 extend from the front wall 90 to a relatively shallow depth wherein a forwardly facing shoulder 116 is formed. The side walls 60, 62 and the end wall 68 extend from the shoulder 116 to a greater depth wherein the back wall 92 closes the cavity 108. The shoulder 116 faces forwardly and serves as a stop to engage and seat portions of the operating handle 400 when the handle 400 is nested within the cavity 108, as will be explained.

Referring to FIGS. 4 and 5, aligned holes 120, 122 are formed through the side walls 60, 62 and open into the cavity 110. The holes 120, 122 serve to receive opposed end regions of a roll pin 450 that also extends through aligned holes 420, 422 that are formed in the operating handle 400 to pivotally mounts the operating handle 400 on the housing 52. An opening 124 is formed through the back wall 92 and communicates with the cavity 108 for receiving projecting portions 412 of the operating handle 400, as will be explained.

Referring to FIG. 4, the body 56 of the housing 52 defines a slide bolt channel 130 for receiving and slidably mounting the slide bolt 200. The channel 130 opens through the back wall 100 and through the side wall 60, and has an end 132 that is engaged by one end of the compression coil spring 250. As is best seen in FIG. 15, a pair of guide formations 134, 136 extend forwardly from the back wall 92 and into the cavity 110 to define opposed side portions of the slide bolt channel 130. The back wall 92 has opposed projecting portions 144, 146 that engage grooves 214, 216 which are formed in opposed sides of the slide bolt 200, as will be explained.

Referring to FIG. 4, the body 56 of the housing 52 also includes an end portion 150 of diminished width for receiving and slidably mounting the operating member 300. The end portion 150 extends from the end wall 66 of the body 54 to a position along the length of the body 54 that is near the slide bolt channel 130. The diminished width of the end portion 150 is defined by a pair of recessed side wall portions 160, 162 that extend along the side walls 60, 62. Grooves 170, 172 are formed in the surfaces 160, 162 and extend in directions that parallel the length of the housing 52 to receive inwardly turned edges 320, 322 of the opposed side portions 310, 312 of the operating member 300, as will be explained in greater detail.

Figure 17:
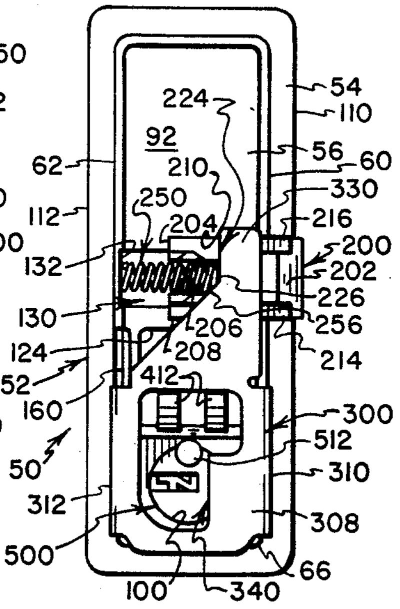
FIG. 17 is a rear elevational view similar to FIG. 16, but with portions of the lock's slide bolt broken away and shown in cross section to permit interacting cam surfaces formed on the lock's operating member and slide bolt to be viewed.

The slide bolt 200 is of elongate configuration and is preferably formed from die cast metal. The slide bolt 200 has a tapered outer end region 202 and a generally flat, transversely extending inner end region 204. A spring-receiving formation in the form of a hole 206 opens through the inner end 204 and extends a short distance into the bolt, as is best seen in FIG. 17. The bolt 200 has opposed side walls 208, 210 that are provided with grooves 214, 216. The bolt 200 has a front wall 230 and a back wall 232. The grooves 214, 216 extend along the opposed side walls 208, 210 and parallel the length of the bolt 200. The grooves 214, 216 are configured to receive the opposed projecting formations 144, 146 of the back wall 92 of the body 56, whereby movements of the slide bolt 200 relative to the housing 52 are confined to such projecting and retracting movements as can be executed along the length of the slide bolt channel 130.

Figure 23:
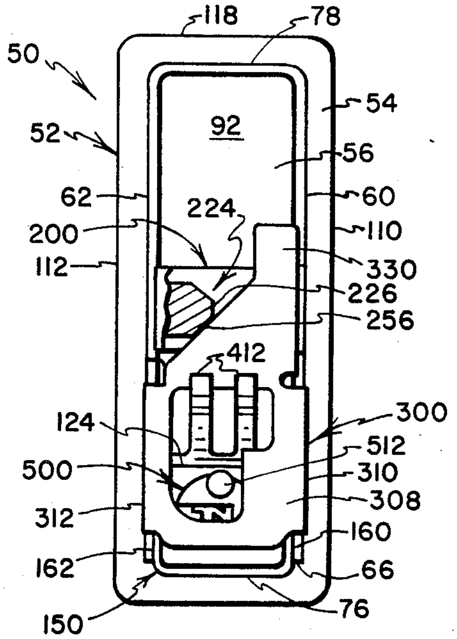

Referring to FIGS. 17 and 23, an additional groove 224 is formed in the slide bolt 200 to receive a projecting tongue portion 330 of a base wall 308 of the operating member 300. The groove 224 interconnects the grooves 214, 216 and defines a short, flat surface 226 that extends transverse to the length of the slide bolt 200 (i.e., that parallels the length of the housing 52. The groove 224 also defines a cam surface 256 that is inclined at an angle of about 45 degrees relative to the length of the housing 52 (i.e., at about a 45 degree angle relative to (1) the direction of movement of the slide bolt 200 in the slide channel 230, and (2) the direction of movement of the operating member 300 along the length of the body 54).

Figure 18:
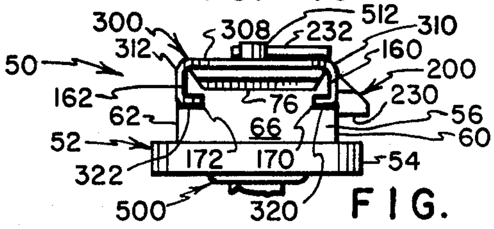
FIG. 18 is a bottom plan view thereof.
Figure 19:
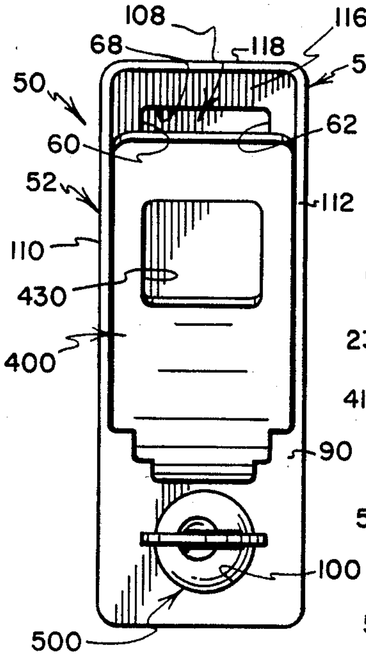
FIG. 19 is a front elevational view of the lock, with the lock's relatively movable components positioned as in FIG. 9.
Figure 20:
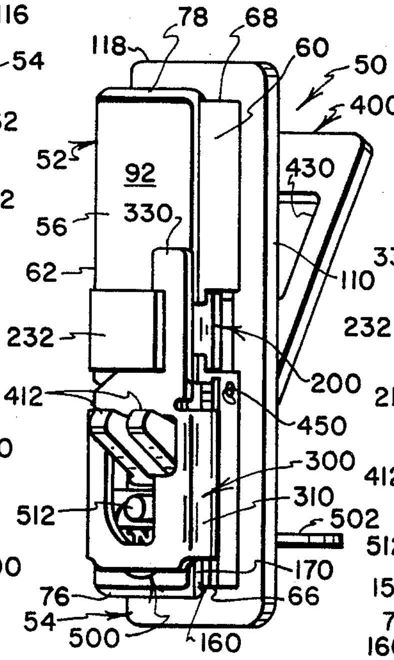
FIG. 20 is a perspective view thereof.
Figure 21:
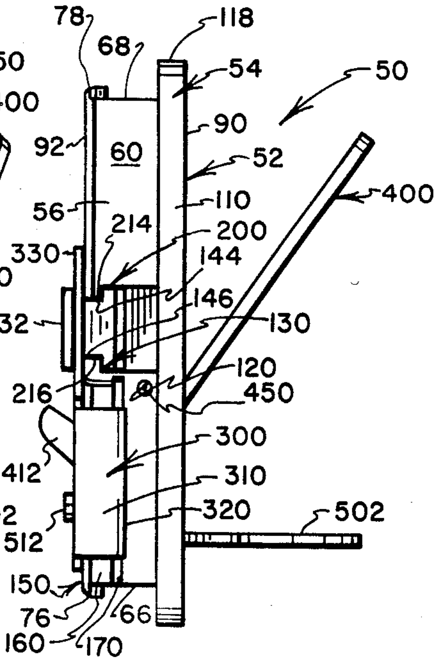
FIGS. 21 and 22 are side and rear elevational views, respectively, thereof; and, FIG. 23 is a rear elevational view similar to FIG. 22, but with portions of the lock's slide bolt broken away and shown in cross section to permit interacting cam surfaces formed on the lock's operating member and slide bolt to be viewed.
Figure 22:
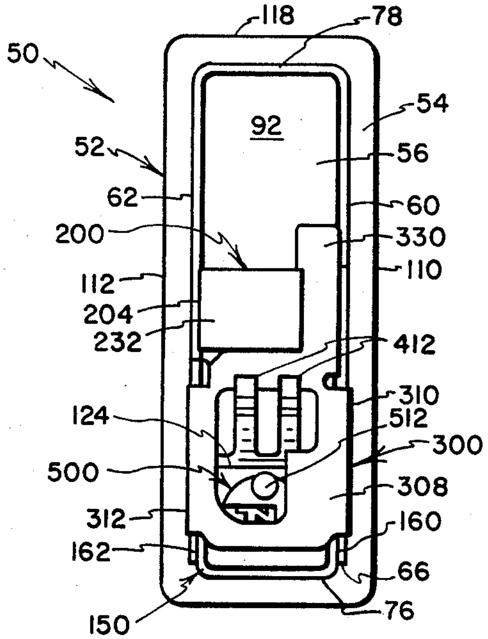

Referring to FIGS. 4 and 12, 14 and 15, the operating member 300 is preferably formed as a stamping from a sheet of steel, and has a base wall 308 that connects opposed, inwardly turned side portions 310, 312. The side portions 310, 312 are of generally U-shaped configuration when viewed from the end of the operating member 300 or when viewed in cross section (see FIGS. 14 and 18). The side portions 310, 312 closely overlie the opposed side surfaces 160, 162 of the diminished-width end region 150, and have inwardly turned edges 320, 322 that extend into the grooves 170, 172. The base wall 308 has a projecting tongue portion 330 that extends into the slide bolt groove 224 and engages the slide bolt surface 226 to retain the slide bolt 200 in position on the housing 52 (i.e., to limit projecting movement of the slide bolt 200 outwardly along the slide bolt channel 130 under the influence of the compression coil spring 250).

An opening 340 is formed through the base wall 308 of the operating member 300. The opening 340 is configured to overlie the key cylinder passage 100 and to overlie the back wall opening 124. The opening 340 is of L-shaped configuration and has right-angled leg portions 342, 344. An engagement surface 346 is defined by the leg 342 of the opening 340. An engagement surface 348 is defined by the leg 344 of the opening 340. Such portions of the base wall 308 that define the opening 340 cooperate with a projecting formation 512 that is provided on the key cylinder 500 to assist in retaining the key cylinder 500 in place on the housing 52, as will be explained.

An inclined cam surface 356 is formed on the operating member 300. The cam surface 356 extends at an angle of about 45 degrees relative to the length of the housing 52, i.e., at about 45 degrees relative to the path of travel of (1) the operating member 300 along the body 56, and (2) the slide bolt 200 along the slide bolt channel 130.

The operating handle 400 is preferably formed as a one piece element from die cast metal, or from rigid, relatively high density injection molded plastics material. The operating handle 400 has a front wall 402, a rear wall 404, and a pair of projections 412 which extend rearwardly from the rear wall 404, through the back wall opening 124, and through the base wall opening 340 to engage the operating member 300. Aligned holes 420, 422 are formed through the projections 412 to receive the handle mounting pin 450 for pivotally mounting the operating handle 300 on the housing 52.

An opening 430 is formed through the operating handle 400 to permit an operator's finger to be inserted therethrough into the cavity 108 of the housing 52 to enable an operator to firmly grasp the operating handle 400 so that the handle 400 can be pivoted with ease about the axis of the pin 450.

Significant ways in which various components of the lock 50 interact can be further understood by examining the manner in which the various components of the lock 50 are assembled. Indeed, a feature of locks which embody the preferred practice of the present invention is the ease with which such locks can be assembled. This ease of assembly results, in significant part, from the manner in which the components interact.

Referring to FIG. 4, a first of four very simple assembly steps involves installing the slide bolt 200 and its compression coil spring 250 onto the housing 52. This is done by inserting one end of the spring 250 into the hole 206, and by sliding the slide bolt 200 into the slide bolt channel 130.

A second assembly step is carried out by sliding the operating member 300 onto the body 56 over the housing end portion 150 so that: (1) the base wall 308 closely overlies the back wall 92; (2) the opposed sides 310, 312 closely overlie the side surfaces 160, 162; (3) the inturned edges 320, 322 extend into the guide grooves 170, 172; and (4) the tongue 330 extends into the slide bolt groove 224. Once the tongue 330 is positioned to extend into the slide bolt groove 224, the slide bolt 200 is held in place on the body 52, i.e., the slide bolt 200 is retained in its channel 130.

The third assembly step calls for insertion of the key cylinder 500 into the key cylinder mounting passage 100. This is effected by orienting the key cylinder 500 so that the projecting formation 512 on the back of the key cylinder 500 is aligned with the groove 104, whereupon the key cylinder 500 can be slided into the hole 102 to a position wherein the projecting portions 512 extends beyond the back wall 92 and through the leg 342 of the opening 340 of the operating member 300. The key cylinder 500 is then rotated relative to the housing 52 to a position wherein (1) the projecting formation 512 is out of alignment with the groove 104, and (2) the operating member 300 is free to move toward the slide bolt 200 so that the engagement surface 348 of the leg 344 of the opening 340 lies alongside the projecting formation 512, whereby the engagement surface 348 prevents the key cylinder 500 from being rotated to a position wherein it can be removed from the housing 52 (i.e., to a position wherein the projecting formation 512 aligns with the groove 102). As the operating member 300 is moved toward the slide bolt 200, its cam surface 356 is brought into engagement with the cam surface 256 of the slide bolt 200. As the cam surfaces 256, 356 are brought into engagement, the operating member 300 assumes a position within its normal range of movement wherein its engagement surface 342 cooperates with the projecting formation 512 of the key cylinder 500 to restrict rotations of the key cylinder 500 to approximately a 180 degree range of rotation, whereby the key cylinder 500 is prevented from returning to its insertion/removal position wherein the projecting formation 512 aligns with the insertion groove 104. By this arrangement, the key cylinder 500 is retained on the housing 52.

The fourth and final assembly step is the mounting of the operating handle 400 on the housing 52. This is completed by inserting the operating handle 400 into the forwardly facing cavity 108, with the projections 412 extending through the back wall opening 124 and through the opening 340 to a position of driving engagement with the engagement surface 346 of the opening 340, and by driving the handle mounting pin 450 into the aligned holes 120, 122, 420, 422.

Once the components of the lock 50 are assembled as has been described, the lock 50 is operational and is ready for mounting on the door 12 by using the spring clip 80, as has been described. Operation of the lock 50 may then take place as follows.

When the door 12 is pivoted toward its closed position, the tapered end 202 of the slide bolt 200 will engage the front plate abutment surface 35. This engagement will cause the slide bolt 200 to retract against the biasing action of the spring 250, whereby the door 12 can be moved to its fully closed position. Once the door 12 is closed, the biasing action of the spring 250 will cause the slide bolt 200 to project into the slot 36 to latch the door 12 closed. Locking of the door 12 in its closed position is a simple matter of operating the key 502 in the key cylinder 500 to position the projecting formation 512 of the key cylinder 500 in its locked position, as is shown in FIGS. 11 and 12, whereby engagement of the projecting formation 512 with the end of the leg 344 of the opening 340 prevents the operating member 300 from moving to its unlatched position; moreover, since the operating member 300 is prevented from moving out of its latched position, the engagement that is made by the surface 346 with the projecting portions 412 of the operating handle 400 likewise serves to prevent pivotal movement of the operating handle 400 about the axis of its mounting pin 450, i.e., the operating handle 400 is retained in its nested position.

Figure 16:
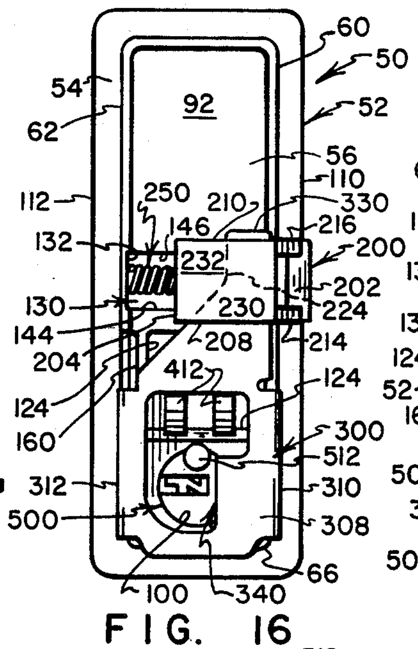
FIG. 16 is a rear elevational view similar to FIG. 12, but with the lock's key cylinder in its unlocked position wherein the key cylinder permits movement of the operating member out of its latched position.

When it is desired to open the door 12, the key cylinder 500 is operated by the key 502 to position the projecting formation 512 in its unlocked position, as is shown in FIGS. 16 and 17, and the operating handle 400 is moved out of its nested position to its operating position, as is illustrated in FIGS. 9 and 19–23. As the operating handle 400 is moved to its operating position, the interacting cam surfaces 256, 356 cause the slide bolt to retract out of the slot 36. Once the door 12 has been pivoted to its open position, the operating handle 400 is released, and the biasing action of the spring 250, as transmitted through the interacting cam surfaces 256, 356 will cause the slide bolt 200 to project, the operating member 300 to return to its latched position, and the operating handle 400 to return to its nested position.

If, while the door 12 is still open, the lock 50 is "locked" as by operating the key 502 in the key cylinder 500 to position the projecting formation 512 so that it blocks unlatching movement of the operating member 300 and so that it blocks movement of the operating handle 400 from its nested position, closure of the door 12 can still be completed, inasmuch as retraction of the slide bolt 200 is not prevented by the "locked" condition of the lock 50. Stated in another way, the tapered end 202 of the bolt 200 can always be "slammed" into engagement with the strike formations 35, 36, for the cam surfaces 256, 356 do nothing to prevent retraction of the bolt 200.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A low profile cabinet lock, comprising:

(a) a one-piece structure including an elongate front wall and an elongate back wall that are relatively closely spaced, and a pair of opposed, elongate side walls, with the front, back and side walls cooperating to define a relatively thin, elongate housing, and with the elongate side walls of the body structure extending substantially parallel to each other and defining the width of the housing;

(b) the housing additionally having:

(i) first formation means defining a forwardly facing cavity for receiving and nesting at least portions of an operating handle, and the housing having an opening formed through the back wall that communicates with the cavity;

(ii) second formation means defining a passage that opens through the front and back walls for receiving and rotatably mounting a key cylinder for movement between locked and unlocked positions in response to operation of the key cylinder using an appropriately configured key;

(iii) third formation means defining a slide bolt channel that opens through one of the side walls and through the back wall for receiving and slidably mounting a slide bolt;

(iv) fourth formation means including:

(A) guide formations defined along the opposed side walls for receiving and slidably mounting opposed side wall portions of an operating member such that the operating member can move closely alongside the back wall in a direction paralleling the length of the housing as guided by the guide formations, and with the guide formations including grooves that are formed in the recessed side wall surfaces, the grooves extending along the recessed side wall surfaces in directions that parallel the length of the housing; and, (B) a pair of elongate, recessed side wall surfaces that are inset from the elongate side walls that define the width of the housing, with the recessed side wall surfaces extending substantially parallel to the length of the housing;

(c) operating handle means including an operating handle pivotally connected to the housing for movement between nested and extended positions relative to the housing, the handle having portions that extend into the cavity, and having a rearwardly projecting portion that extends through the back wall opening;

(d) key cylinder means including a key cylinder positioned in the passage and rotatably connected to the housing for movement relative thereto between locked and unlocked positions in response to the key cylinder's being operated using an appropriately configured key;

(e) slide bolt means including a slide bolt positioned in the channel and slidably connected to the housing for movement relative thereto between projected and retracted positions;

(f) biasing means connected to the housing for biasing the slide bolt toward its projected position;

(g) operating means including an operating member extending closely alongside the back wall and having opposed side wall portions that engage the guide formations, the operating means being slidably connected to the housing for movement relative thereto closely alongside the back wall between latched and unlatched positions, and being operable:

(i) to engage the slide bolt and to retain the slide bolt in the channel;

(ii) to engage the key cylinder and to retain the key cylinder in the passage;

(iii) to engage the projecting formation means and to establish a driving connection between the operating handle and the slide bolt that will cause the slide bolt to move toward its retracted position in response to pivotal movement of the operating handle toward its extended position; and, (iv) to engage and to cooperate with the key cylinder when the key cylinder is in its locked position to retain the operating handle in its nested position and to retain the operating member in its latched position; and, (h) the operating member being formed by a stamped metal part that has a base wall that interconnects the opposed side wall portions and that extends closely alongside the back wall of the housing, with the opposed side wall portions of the operating member (i) extending substantially parallel to each other, (ii) lying closely alongside the recessed side wall surfaces of the body, (iii) engaging the guide formations, and (iv) defining the width of the operating member, with the width of the operating member being substantially the same as the width of the body.

2. The lock of claim 1, wherein:

(a) a receiving opening is formed through the base wall portion of the operating member;

(b) the key cylinder includes a locking formation that extends through the receiving opening; and, (c) the receiving opening and the locking formation are configured such that:

(i) when the key cylinder is in its unlocked position the locking formation poses no obstacle to movement of the operating member between its latched and unlatched positions; and, (ii) when the key cylinder is in its locked position, the locking formation engages the operating member and prevents movement of the operating member out of its latched position.

3. The lock of claim 2 wherein the receiving opening overlies the back wall opening, and the rearwardly projecting portion of the operating handle extends into the receiving opening to engage the operating member and to thereby establish a driving connection between the operating merber and the operating handle.

4. The lock of claim 3 wherein the operating member and the slide bolt include interacting cam surfaces that are maintained in engagement by the biasing action of the biasing means, and wherein the interacting cam surfaces cooperate to translate linear movement of the operating member along the housing in response to movement of the operating handle toward its extended position into movement of the slide bolt toward its retracted position.

5. The lock of claim 4 wherein the interacting cam surfaces are arranged such that, in the event external force is applied to the slide bolt in a direction which tends to cause slide bolt retraction, the operating member will not impede resulting retraction of the slide bolt even if the operating member is being retained in its latched position by the key cylinder, whereby the slide bolt can, at all times, be "slammed" into latching engagement with a suitably configured strike formation.

6. The lock of claim 1 wherein the operating handle has an opening formed through it that overlies the forwardly facing cavity of the housing, with the opening formed through the operating handle being of sufficient size to enable an operator's finger to be inserted therethrough and into the cavity when the operating handle is nested to facilitate the operator's grasping the operating handle.

7. The lock of claim 1, wherein:
(a) the slide bolt has first groove means formed on opposed sides thereof in directions that parallel the length of the slide bolt channel for engaging such portions of the housing as define opposed sides of the slide bolt channel;
(b) the slide bolt has second groove means formed therein and extending in a direction that substantially parallels the path of travel of the operating member; and,
(c) the operating member has a projecting tongue formation that extends into the second groove means and limits the extent to which the slide bolt can move along the slide bolt channel in a direction away from its retracted position.

8. The lock of claim 1 wherein the housing, the slide bolt and the operating member have portions that lie closely alongside each other and thereby serve to reinforce the overall strength of the lock.

9. The lock of claim 1 wherein the slide bolt has spaced portions that sandwich portions of the housing and the operating member, and thereby serve to reinforce the overall strength of the lock.

10. The lock of claim 1 additionally including means for mounting the lock on a closure, including:
(a) a generally C-shaped retaining clip formed from spring steel and having a stem portion that interconnects a pair of spaced leg portions, with the leg portions extending substantially parallel to each other; and,
(b) clip engaging means on the housing for cooperating with the legs of the spring clip to clamp a closure between the spring clip and portions of the housing.

11. A lock for cabinets and the like, comprising:
(a) a housing having:
(i) an elongate body that has opposed sides which define a pair of track formations that extend substantially parallel to the length of the body;
(ii) a key cylinder receiving formation defined by the body;
(iii) a slide bolt channel defined by the body, extending substantially transverse to the length of the body, and opening through one of the opposed sides thereof;
(b) handle means including an operating handle that is pivotally connected to the housing for movement between a nested position wherein portions of the handle are received in nested relationship by the housing, and an operating position wherein a portion of the handle projects from the housing, the handle further including projecting formation means for drivingly engaging an operating member;
(c) operating means including an operating member that has mounting formations which engage the track formations to slidably mount the operating member on the body for movement between latched and unlatched positions, and that has an engageable formation which drivingly engages the projecting formation means on the handle;
(d) key cylinder means carried within the key cylinder receiving formation and having stop means that is movable between a locked position wherein the stop means prevents the operating member from moving out of its latched position, and an unlocked position wherein the stop means permits movement of the operating member between its latched and unlatched positions;
(e) slide bolt means including a slide bolt carried within the slide bolt channel for movement between retracted and projected positiosn with respect to the body;
(f) biasing means for biasing the slide bolt toward its projected position;
(g) interacting formation means on the slide bolt and on the operating member for causing the slide bolt to move from its projected position to its retracted position in response to movement of the operating member from its latched to its unlatched positions, and for transmitting the biasing action of the biasing means from the slide bolt to the operating member to bias the operating member toward its latched position; and,
(h) mounting pin means extending along a pivot axis through aligned holes formed in the housing and formed in the handle means for pivotally mounting the operating handle on the housing, with the pivot axis being oriented to extend substantially parallel to the path of movement of the slide bolt means.

12. The lock of claim 11 wherein the housing defines forwardly facing recess means for receiving portions of the operating handle and for nesting portions of the operating handle therein when the operating handle is in its nested position, and the operating handle is configured to have portions that are received within the forwardly facing recess means when the operating handle is in its nested position.

13. The lock of claim 11 wherein the slide bolt channel defines a path of movement for the slide bolt means to execute in moving between its retracted and projected positions, said path of movement extending substantially transverse to the length of the body.

14. A lock for cabinets and the like, comprising:
(a) a housing having:
(i) an elongate body that has opposed sides which define a pair of track formations that extend substantially parallel to the length of the body;
(ii) a key cylinder receiving formation defined by the body;
(iii) a slide bolt channel defined by the body, extending substantially transverse to the length of the body, and opening through one of the opposed sides thereof;
(b) handle means including an operating handle that is pivotally connected to the housing for movement between a nested position wherein portions of the handle are received in nested relationship by the housing, and an operating position wherein a portion of the handle projects from the housing, the handle further including projecting formation means for drivingly engaging an operating member;
(c) operating means including an operating member that has (i) mounting formations which engage the track formations to slidably mount the operating member on the body for movement between latched and unlatched positions, (ii) an engageable formation which drivingly engages the projecting formation means on the handle, (iii) opposed side wall portions and a base wall portion that interconnects the opposed side wall portions, and (iv) a receiving opening formed through the base wall portion;

(d) key cylinder means carried within the key cylinder receiving formation and having stop means that extends through the receiving opening and is movable between (i) a locked position wherein the stop means prevents the operating member from moving out of its latched position, and (ii) an unlocked position wherein the stop means permits movement of the operating member between its latched and unlatched positions;

(e) slide bolt means including a slide bolt carried within the slide bolt channel for movement between retracted and projected positions with respect to the body;

(f) biasing means for biasing the slide bolt toward its projected position;

(g) interacting formation means on the slide bolt and on the operating member for causing the slide bolt to move from its projected position to its retracted position in response to movement of the operating member from its latched to its unlatched positions, and for transmitting the biasing action of the biasing means from the slide bolt to the operating member to bias the operating member toward its latched position; and, (h) the receiving opening and the stop means are configured such that:

(i) when the key cylinder is in its unlocked position the stop means poses no obstacle to movement of the operating member between its latched and unlatched positions; and, (ii) when the key cylinder is in its locked position, the stop means engages the operating member and prevents movement of the operating member out of its latched position.

15. The lock of claim 14 wherein the operating member has a wall portion that defines both the engageable formation and the receiving opening, and the projecting formation means of the operating handle extends into the receiving opening to engage the engageable formation and to thereby establish a driving connection between the operating member and the operating handle.

16. The lock of claim 15 wherein the interacting formation means include interacting cam surfaces that are formed on the operating member and on the slide bolt, and that are maintained in engagement by the biasing action of the biasing means, whereby the interacting cam surfaces cooperate to translate linear movement of the operating member along the housing in response to movement of the operating handle toward its extended position into movement of the slide bolt toward its retracted position.

17. The lock of claim 16 wherein the interacting cam surfaces are arranged such that, in the event external force is applied to the slide bolt in a direction which tends to cause slide bolt retraction, the operating member will not impede resulting retraction of the slide bolt even if the operating member is being retained in its latched position by the key cylinder means, whereby the slide bolt can, at all times, be "slammed" into latching engagement with a suitably configured strike formation.

18. A lock for cabinets and the like, comprising:

(a) a housing having:

(i) an elongate body that has opposed sides which extend substantially parallel to each other and which define (A) the width of a body portion of the housing, and (b) a pair of track formations that extend substantially parallel to the length of the body;

(ii) a key cylinder receiving formation defined by the body;

(iii) a slide bolt channel defined by the body, extending substantially transverse to the length of the body, and opening through one of the opposed sides thereof;

(b) handle means including an operating handle that is pivotally connected to the housing for movement between a nested position wherein portions of the handle are received in nested relationship by the housing, and an operating position wherein a portion of the handle projects from the housing, the handle further including projecting formation means for drivingly engaging an operating member;

(c) operating means including an operating member that has mounting formations which engage the track formations to slidably mount the operating member on the body for movement between latched and unlatched positions, and that has an engageable formation which drivingly engages the projecting formation means on the handle;

(d) key cylinder means carried within the key cylinder receiving formation and having stop means that is movable between a locked position wherein the stop means prevents the operating member from moving out of its latched position, and an unlocked position wherein the stop means permits movement of the operating member between its latched and unlatched positions;

(e) slide bolt means including a slide bolt carried within the slide bolt channel for movement between retracted and projected positions with respect to the body;

(f) biasing means for biasing the slide bolt toward its projected position;

(g) interacting formation means on the slide bolt and on the operating member for causing the slide bolt to move from its projected position to its retracted position in response to movement of the operating member from its latched to its unlatched positions, and for transmitting the biasing action of the biasing means from the slide bolt to the operating member to bias the operating member toward its latched position;

(h) the track formations of the housing including a pair of elongate recessed side wall surfaces that are inset from the elongate opposed sides that define the width of the body portion, with the recessed side wall surfaces extending substantially parallel to the length of the housing;

(i) the track formations further including grooves that are formed in the recessed side wall surfaces, the grooves extending along the recessed side wall surfaces in directions that parallel the length of the housing;

(j) the operating member is a stamped metal part having a base wall that interconnects the opposed side wall portions of the operating member; and, (k) the opposed side wall portions of the operating member extend substantially parallel to each other, lie closely alongside the recessed side wall surfaces of the body portion, and define the width of the operating member, with the width of the operating member being substantially the same as the width of the body portion.

19. The lock of claim 18 wherein the operating handle has an opening formed through it to enable an operator's finger to be inserted therethrough to facilitate the operator's grasping the operating handle.

20. The lock of claim 18 additionally including means for mounting the lock on a closure, including:

(a) a generally C-shaped retaining clip formed from spring steel and having a stem portion that interconnects a pair of spaced leg portions, with the leg portions extending substantially parallel to each other; and, (b) clip engaging means on the housing for cooperating with the legs of the spring clip to clamp a closure between the spring clip and portions of the housing.

21. An easily assembled, low-profile cabinet lock, comprising:

(a) a one-piece structure including an elongate front wall and an elongate back wall that are relatively closely spaced, and a pair of opposed, elongate side walls, the front, back and side walls cooperating to define a relatively thin, elongate housing;

(b) an elongate slide bolt having opposed sides and having grooves formed in the opposed sides and extending in directions that parallel the length of the slide bolt, the slide bolt having inner and outer ends that define its length, and having a spring-receiving formation that opens through the inner end;

(c) a compression coil spring having opposed end regions, with one of the opposed end regions being configured to be received within the spring-receiving formation of the slide bolt;

(d) the housing including slide bolt-receiving means for defining an elongate, relatively narrow slide bolt channel that has one end which opens through one of the opposed side walls, and another end that is located near the other of the opposed side walls, including opposed projecting formations for extending into the grooves that are formed in the opposed sides of the slide bolt, whereby the slide bolt and the compression coil spring can be installed on the housing by inserting one end region of the compression coil spring into the spring-receiving formation of the slide bolt, and by sliding the slide bolt into the slide bolt channel with the projecting formations extending into the grooves that are provided in opposite sides of the slide bolt, and with the other end region of the spring engaging the other end of the slide bolt channel;

(e) operating handle means including an operating handle for pivotal connection to the housing and for movement relative to the housing between nested and retracted positions, the handle having a front portion and a projecting portion that extends rearwardly from the front portion;

(f) the housing having a handle-receiving cavity that opens through the front wall, that is configured to receive and nest at least portions of the operating handle, and that has an opening which extends through the back wall to receive the handle's projecting portion;

(g) the housing and the operating handle having aligned holes formed therethrough, and pin means for insertion through the aligned holes to pivotally connect the operating handle to the housing;

(h) operating means for drivingly interconnecting the projecting portion of the handle and the slide bolt for causing the slide bolt to move from its projected to its retracted position in response to movement of the handle from its nested to its extended positions;

(i) the housing having guide means extending along at least portions of the opposed side walls and paralleling the length of the housing for slidably mounting the operating means on the housing and for guiding the operating means for movement between latched and unlatched positions along a path of travel that parallels the length of the housing, whereby the operating means is installed onto the housing by sliding it into engagement with the guide means;

(j) key cylinder means for mounting on the housing and for cooperating with the operating means to selectively permit and prohibit movement of the operating means from its latched to its unlatched positions;

(k) the housing having a passage formed therein for receiving and rotatably mounting the key cylinder means for movement between locked and unlocked positions, with the passage being configured to permit insertion and withdrawal of the key cylinder means only when the key cylinder means is oriented in a particular attitude with respect to the passage, whereby assembly of the key cylinder means onto the housing is effected by orienting the key cylinder means in said attitude and inserting it into position; and, (l) the operating means and the slide bolt having engaging, interacting cam means formed thereon for cooperating to:

(i) establish a driving connection between the operating means and the slide bolt that will cause the slide bolt to move toward its retracted position in response to movement of the operating means toward its unlatched position; and, (ii) transmit the biasing action of the compression coil spring from the slide bolt to the operating means to cause the operating means to be biased toward its latched position as the slide bolt as the slide bolt is biased toward its projected position.

22. The lock of claim 21, wherein:

(a) the passage includes a groove extending therethrough and is configured to permit the key cylinder means to be inserted through the front wall for installation of the key cylinder onto the housing;

(b) the key cylinder means carries a projecting formation that must be aligned with the groove in the passage in order for the key cylinder means to be inserted into or removed from the housing;

(c) the projecting formation is operable when out of alignment with the groove that is formed in the passage to cooperate with the back wall of the housing to retain the key cylinder means in place on the housing; and, (d) the operating means is operable to block the projecting formation from aligning with the groove that is formed in the passage, whereby the operating means is operable to retain the key cylinder means on the housing.

23. The lock of claim 21 additionally including means for mounting the lock on a closure, including:

(a) a generally C-shaped retaining clip formed from spring steel and having a stem portion that interconnects a pair of spaced leg portions, with the leg portions extending substantially parallel to each other; and, (b) clip engaging means on the housing for cooperating with the legs of the spring clip to clamp a closure between the spring clip and portions of the housing.

* * * * *